350-313 CROSS REFERENCE SEARCH ROOM
178/5.4

March 31, 1959 P. C. GOLDMARK ET AL 2,880,267

COLOR TELEVISION APPARATUS

Filed Sept. 22, 1954 2 Sheets-Sheet 1

X2661

INVENTORS
PETER C. GOLDMARK
JOHN W. CHRISTENSEN
BY
Campbell, Brumbaugh, Free & Graves
THEIR ATTORNEYS

COLOR TELEVISION APPARATUS

Filed Sept. 22, 1954 2 Sheets-Sheet 2

INVENTORS
PETER C. GOLDMARK
JOHN W. CHRISTENSEN
BY
Campbell, Brumbaugh, Free & Graves
THEIR ATTORNEYS United States Patent Office 2,880,267

Patented Mar. 31, 1959

2,880,267

COLOR TELEVISION APPARATUS

Peter C. Goldmark, New York, and John W. Christensen, Forest Hills, N.Y., assignors to Columbia Broadcasting System, Inc., New York, N.Y., a corporation of New York Application September 22, 1954, Serial No. 457,676

6 Claims. (Cl. 178—5.4)

The present invention relates to color television, and, more particularly, to novel and improved color television apparatus in which signals representing the luminance or brightness of an object being televised are obtained directly by scanning an appropriate color separation of the object.

In accordance with the current N.T.S.C. (National Television System Committee) standards, a signal representative of the brightness or luminance of the object being scanned by a color television transmitter is transmitted as an amplitude modulation of a carrier simultaneously with two additional signals containing color information as to hue and saturation (so-called chrominance components), respectively, which are transmitted on a sub-carrier in quadrature relation. The luminance or Y signal represents an additive combination of the red, blue and green components of the light emanating from the object being televised and the Y voltage signal $E_{Y'}$ is defined by the relation:

$$E_{Y'}=0.59E_{G'}+0.30E_{R'}+0.11E_{B'} \qquad (1)$$

where $E_{G'}$, $E_{R'}$ and $E_{B'}$ are voltages representing the green, red and blue color components in the object. The chrominance signals representing the color information are also combinations of the several primary colors and have been denoted I and Q. By definition, the I and Q voltages $E_{I'}$ and $E_{Q'}$, respectively, are given by the following relations:

$$E_{I'}=0.74(E_{R'}-E_{Y'})-0.27(E_{B'}-E_{Y'}) \qquad (2)$$

$$E_{Q'}=0.48(E_{R'}-E_{Y'})+0.41(E_{B'}-E_{Y'}) \qquad (3)$$

In one type of color television system now in use, the red, blue and green color components from which the Y, I and Q signals are derived are obtained by simultaneously scanning an object field with a plurality of scanning devices responsive, respectively, to the three color components. For satisfactory performance, the three color separations scanned by the scanning device must be maintained closely in register and this is difficult to do in practice.

In an effort to minimize the problem of misregistration, a system has been devised (described in detail in the copending U.S. application Serial No. 375,219, filed August 19, 1953, by Peter C. Goldmark, for "Color Television") wherein a single camera tube is employed to scan color separations of an object field sequentially at a field frequency higher than that prescribed by the N.T.S.C. standards. The sequential color video signals produced by the single camera tube are then converted to the N.T.S.C. standard form by a signal converter including a plurality of picture tubes for producing images that are adapted to be scanned by a corresponding number of scanning tubes, respectively. In a preferred form, two of the camera tubes produce images in response to the red and blue signals while a third responds to a Y signal derived from a combination of the red, blue and green signals according to Equation 1 above.

Since all three of the primary color components are originally scanned in a field sequential manner by only one camera tube, color separation registration problems are minimized and a Y signal adequately representative of the detail in the object being televised may readily be produced. However, the fidelity with which detail in the object is finally reproduced depends largely on the extent to which the Y signal represents detail in the original and any improvement in this direction would be advantageous.

It is an object of the invention, therefore, to provide new and improved means whereby a color television Y signal may be obtained that is more accurately representative of detail in an object being televised than has been possible heretofore.

Another object of the invention is to provide novel and improved apparatus of the above character embodying means enabling a color separation of the original to be obtained that has the correct properties required for direct derivation of the Y signal in the initial scanning operation.

In accordance with the invention, color separations of an object to be televised are scanned sequentially as in the system disclosed in the aforementioned copending application Serial No. 375,219. Two of the color separations are red and blue, as in that system. However, instead of green, the third color separation is a composite of red, blue and green in the proper proportions to provide a signal output from the camera tube which is representative of the Y signal as defined in Equation 1 above. In this fashion, the Y signal is derived directly from the single initial scanning tube in the system without any necessity for accurate registration of color separations. Hence, the Y signal obtained is more truly representative of fine detail in the original object than has been possible heretofore, resulting in substantial improvement in the fidelity with which such detail can be reproduced on a terminal picture tube in the system.

A more complete understanding of the invention may be had by reference to the following detailed description taken in conjunction with the accompanying figures of the drawing, in which.

Figures 1, 2C, 3, 4, 4A:
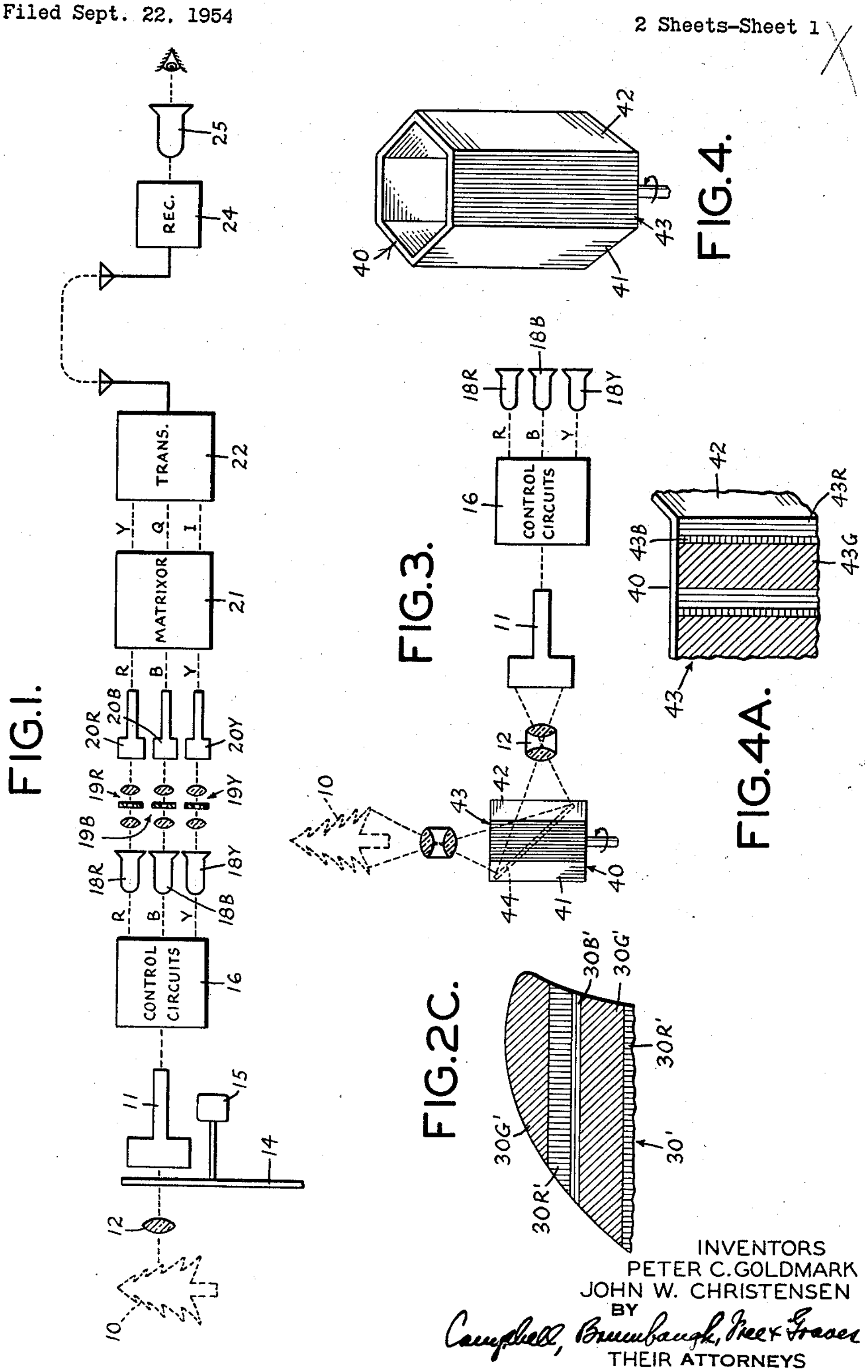
Fig. 1 is a schematic block diagram of a typical color television system, in accordance with the invention.
Fig. 2C is an enlarged view of a fragment of a portion of the disc shown in Fig. 2B.
Fig. 3 is a schematic block diagram of a portion of a color television system showing an alternate embodiment of the invention.
Fig. 4 is an enlarged perspective view of the color filter drum in Fig. 3, showing the filter sections in greater detail.
Fig. 4A is an enlarged view of a fragment of a composite filter section of the drum shown in Fig. 4, illustrating the details of the filter elements.

Referring now to Fig. 1, an object field 10 is scanned by a suitable monochromatic field-sequential camera tube 11, through suitable optical means 12. The camera tube 11 is adapted to scan successively different color separations of the light received from the object as determined by a color filtering device, such as a color sectored filter disc 14, which is driven in a conventional manner by a power means 15 operating in synchronism with the field scanning action of the camera 11.

Figures 2A, 2B:
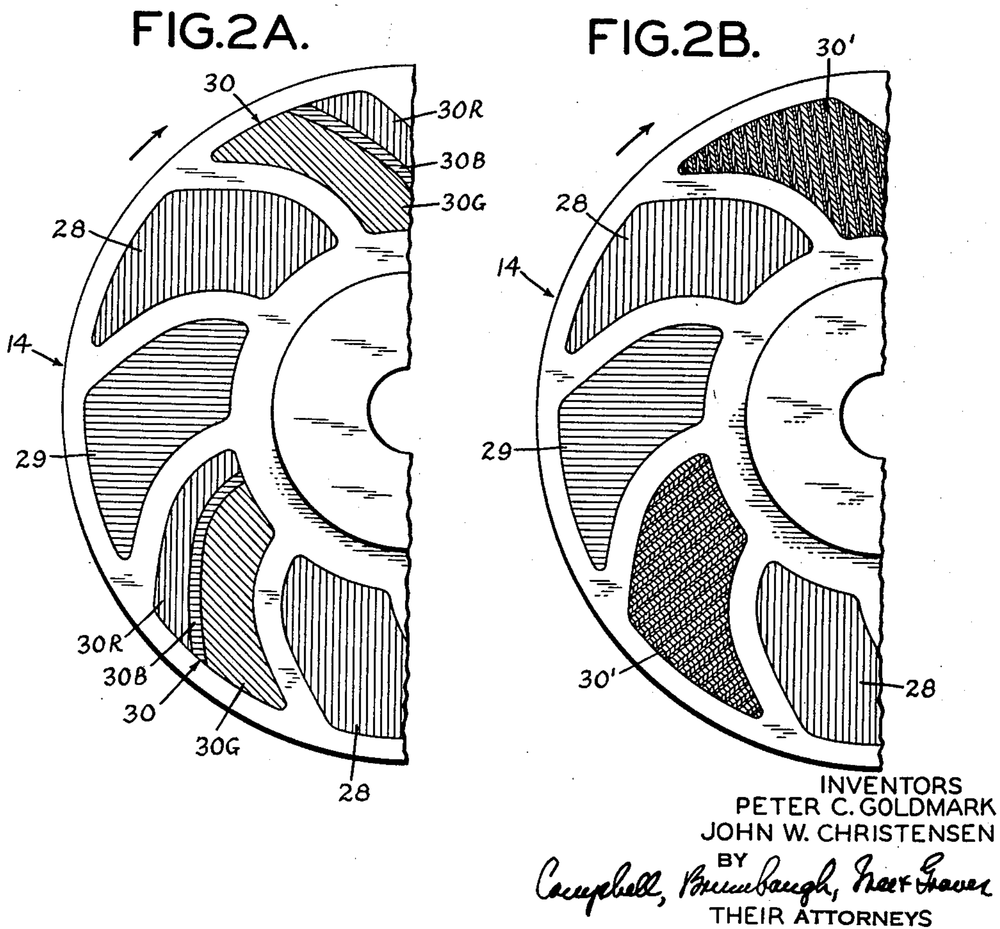
Figs. 2A and 2B are front views, partially in section, of typical color sectored filter discs, for use in the system of Fig. 1 when camera tubes having characteristics represented by Figs. 1A and 1B, respectively, are embodied therein.

The construction of the filter disc 14 may be generally in accordance with the disclosure in prior Patent No. 2,304,081. As shown in Fig. 2A it has a plurality of segments 28, 29, and 30 of different light transmission characteristics, spaced around the disc. The segments 28 and 29 may be light filters adapted to transmit only red and blue light, respectively. However, the segments 30 are designed to have light transmission characteristics such that signals produced by the camera tube 11 in response to light passing through a segment 30 will have substantially the characteristics of the Y signal as defined in Equation 1 above.

Figure 1A:
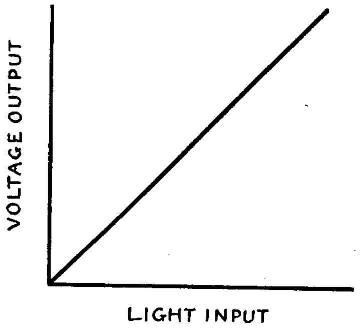
Figs. 1A and 1B are graphs of typical storage characteristics of two different forms of camera tubes that might be used in Fig. 1.

If the camera tube 11 is one having a linear storage characteristic represented by the curve shown in Fig. 1A, such as the so-called "CPS" (Cathode Potential Stabilized) emitron, for example, one way of achieving the desired light transmission characteristics for the segments 30 is to form them with a plurality of adjacent zones 30R, 30B and 30G adapted to transmit only red, blue and green light, respectively, the areas of the adjacent zones being in the proportions 30R:30B:30G as 30:11:59. With this construction, it will be understood that the light transmitted through the segments 30 during the scanning operation will cause the signal output from the camera tube 11 to have the desired Y signal characteristics.

As set forth in detail in the aforementioned copending application, a double-interlaced scanning pattern is employed by the camera tube 11 and successive fields correspond to different color components of the object field in regularly recurring sequence. The sequential color video signals produced by the camera tube 11 may be directed to three separate color information channels R, B and Y, respectively, by means of suitable control circuits 16 (Fig. 1), including a color signal separator.

The video signals in each of the R, B and Y channels bay be coupled to picture tubes 18R, 18B and 18Y, which produce images representative respectively of the R, B, and Y color information in the video signals from the camera tube 11. The images on the picture tubes 18R, 18B, and 18Y, which may be conventional kinescopes, are monochromatic and may be in the same monochrome. These images are respectively scanned through suitable optical means 19R, 19B and 19Y by three camera tubes 20R, 20B and 20Y each of which may be a conventional image orthicon preferably adapted to operate on the linear portion of its transfer characteristic.

In order to eliminate moire effects, the scanning directions in the picture tubes 18R, 18B and 18Y and in the camera tubes 20R, 20B and 20Y, are preferably mutually perpendicular.

The camera tubes 20R, 20B and 20Y are adapted to scan the images on the picture tubes 18R, 18B and 18Y, respectively, in a simultaneous manner at the field scanning rate prescribed in the current N.T.S.C. specifications, to produce R, B and Y video signals, respectively, which are fed through the corresponding channels to a conventional matrixor 21 wherein Y, I and Q signals are developed. The video signals in the Y, I and Q channels are then fed to suitable transmitter circuits 22, by means of which they are transmitted in any suitable way to the ultimate receiver circuits 24 to control the formation of a color picture image or a conventional black and white picture image upon the face of the receiver tube 25.

Figure 1B:
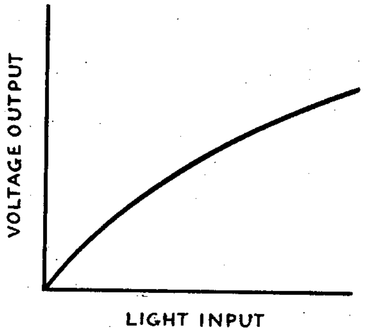

If the camera tube 11 used has a non-linear storage characteristic of the type represented by the curve in Fig. 1B, as in the case of the image orthicon, for example, it is preferred to use a color sectored disc of the type shown in Fig. 2B. This form comprises a plurality of red and blue sectors 28 and 29, as in the disc shown in Fig. 2B. However, the Y segments 30 in this embodiment comprise a plurality of adjacent groups of red, blue and green zones. As best shown in Fig. 2C, the widths of the adjacent red, blue and green zones are in the proportions 30R′:30B′:30G′=30:11:59. Also the overall width of each group of adjacent zones 30R′, 30B′ and

30G′ is the same as is sufficiently small to insure that the tube storage characteristic over the corresponding exposure interval is substantially linear.

In a typical color sectored disc 14 according to Fig. 2B having a disc diameter of 8 inches, good results may be achieved by providing about sixteen groups of adjacent zones 30R′, 30B′ and 30G′, of widths .020″, .060″ and .120″, respectively. However, the number of groups is not critical and a lesser number may be used. Of course, the fewer the number of groups of color zones, 30R′, 30B′ and 30G′ used, the more pronounced will be the effect of the non-linear storage characteristic (Fig. 1B) of the tube 11.

In the alternate embodiment of Fig. 3, the color filtering device comprises a color filter drum 40 having adjacent red and blue filter sections 41 and 42, respectively, which may be constructed in accordance with the disclosure in prior U.S. Patent No. 2,435,963. However for the usual green filter sections are substituted composite filter sections 43 similar to the filter segments 30′ of Fig. 2B, as shown in greater detail in Fig. 4A. The Y sections 43 of Fig. 4 are a composite of successive red, blue and green filter zones 43R, 43B and 43G having areas in the correct proportion to produce the desired Y signal from the scanning tube 11, as described above in greater detail. Of course, with a camera tube 11 having a linear storage characteristic, the Y sections 43 would be similar in construction to the Y segments 30′ in Fig. 2A. A reflector 44 may be disposed inside the drum 40 as shown to direct light from the object 10 to the camera tube 11. Otherwise, this form of the invention operates in the same manner as that illustrated in Fig. 1.

Thus there has been provided, in accordance with the invention, novel and improved means for directly deriving a Y signal in a color television system. By virtue of the fact that the Y signal is derived directly from a single camera tube and no registration of color separations is involved, considerable improvement in the ability of the system to reproduce fine detail may be achieved.

The several specific embodiments disclosed herein are meant to be merely exemplary and it will be understood that they are susceptible of modification and variation without departing from the spirit and scope of the invention as defined in the following claims.

We claim:

1. In combination, individual means for scanning an object to be reproduced, a plurality of optical color separation means and means for interposing said color separation means successively between said object and said scanning means, certain of said optical color separation means respectively being capable of directing to said scanning means only predetermined primary color components in the light received from said object, and at least one other of said optical color separation means being capable of directing to said scanning scanning means only an additive combination of specified proportions of predetermined color components in the light received from said object.

2. In color television apparatus, the combination of a camera tube for scanning an object to be televised, and a plurality of optical color separation means mounted for sequential interposition between said object and said camera tube, certain of said color separation means being capable of transmitting to said camera tube only red and blue color components, respectively, in the light received from said object, and at least one other optical color separation means capable of transmitting to said camera tube only an additive mixture of red, blue and green primary color components in the light received from said object, in the proportions of about 30 to 11 to 59, respectively.

3. In a television system, scanning apparatus for scanning an object field in cooperation with a television camera to obtain information as to the presence of an artificial color component characterized by an additive mixture of the primary colors red, blue and green in predetermined proportions, comprising a rotatable light responsive area adapted to intercept the optical path from the object field to said television camera, at least a portion of which is composed of a plurality of smaller contiguous areas having different light responsive characteristics corresponding respectively to different ones of the primary colors red, blue, and green, and having relative areas in the proportions of about 30 to 11 to 59, respectively, corresponding to the additive mixture of said artificial light component.

4. In a television system, scanning apparatus for scanning an object field in cooperation with a television camera to obtain information as to the presence of an artificial color component characterized by an additive mixture of the primary colors, red, blue and green in predetermined proportions, and two primary color components, red and blue, comprising a plurality of light responsive areas adapted to intercept in a sequentially recurring manner the optical path from the object field to said television camera, said plurality of light responsive areas having different light responsive characteristics corresponding sequentially to said two primary color components and said artificial color component, and said artificial color component light responsive areas being composed of a plurality of smaller contiguous areas having different light responsive characteristics corresponding respectively to different ones of the primary colors, red, blue and green, and having relative areas in the proportions 30 to 11 to 59, respectively, corresponding to the additive mixture of said artificial light component.

5. In a color television system, the combination of a first video link including field sequential camera means for scanning an object field through a color filter device to produce a color video signal having three sequentially recurring color components, said color filtering means comprising a plurality of different color component sections corresponding to said three sequentially recurring color components, at least one of said color component sections being a composite of successive areas respectively corresponding to different ones of three primary color components, image producing means for producing separate images responsive respectively to said three sequentially recurring color components, a second video link including a plurality of scanning means for simultaneously respectively scanning separate images produced by said plurality of image producing means in said first video link to produce a first plurality of video signals respectively carrying different color information corresponding to said three sequentially recurring color components, and matrix means for combining said first plurality of video signals to produce a second plurality of altered video signals for transmission to receiving means.

6. A color separation device for use in sequential color television systems and the like having means for scanning an object to be reproduced in which the color separation device is interposed between the object and the scanning means, comprising a member carrying adjacent filter sections for successive interposition between said object and said scanning means, two adjacent ones of said sections being capable of transmitting only red and blue light, respectively, and a third of said sections being formed with a plurality of contiguous areas capable of transmi tting red, blue and green light, respectively, in the proportions of about 30 to 11 to 59.

References Cited in the file of this patent

UNITED STATES PATENTS

| | | |
|---|---|---|
| 2,429,849 | Somers | Oct. 28, 1947 |
| 2,531,031 | France | Nov. 21, 1950 |
| 2,607,845 | Clark | Aug. 19, 1952 |
| 2,612,553 | Homrighous | Sept. 30, 1952 |